Figure 1:
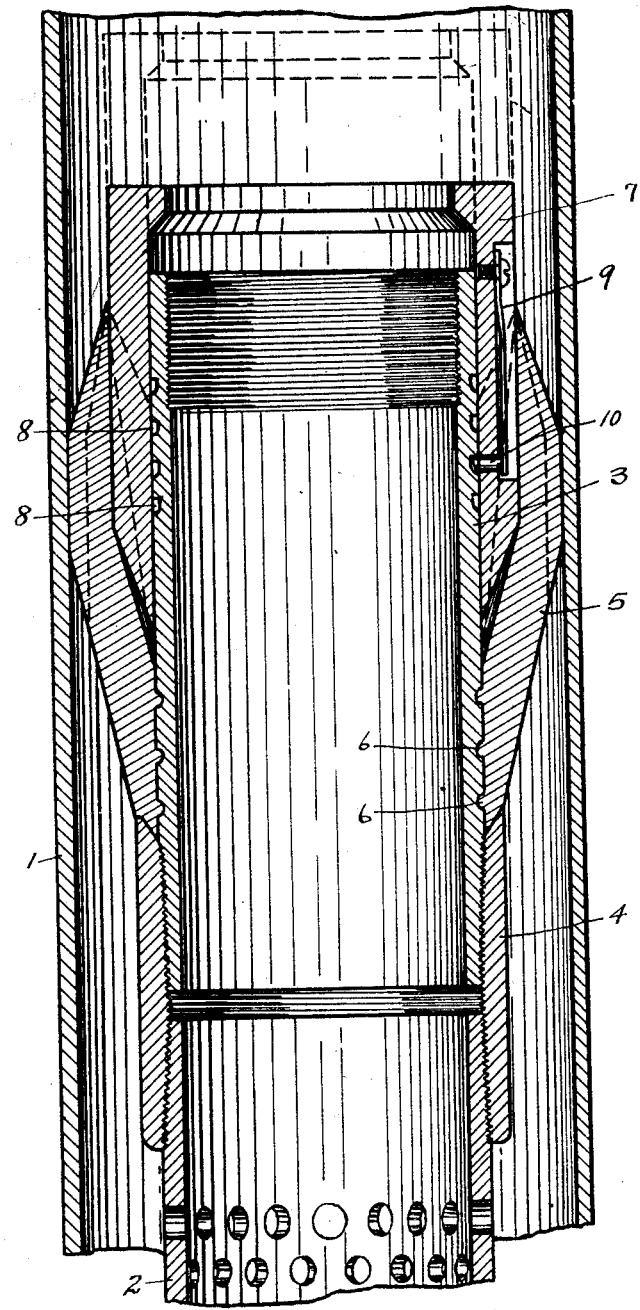

Sept. 11, 1928.
E. F. WEISE
1,683,640
SEALING DEVICE
Original Filed Aug. 12, 1919    2 Sheets-Sheet 2
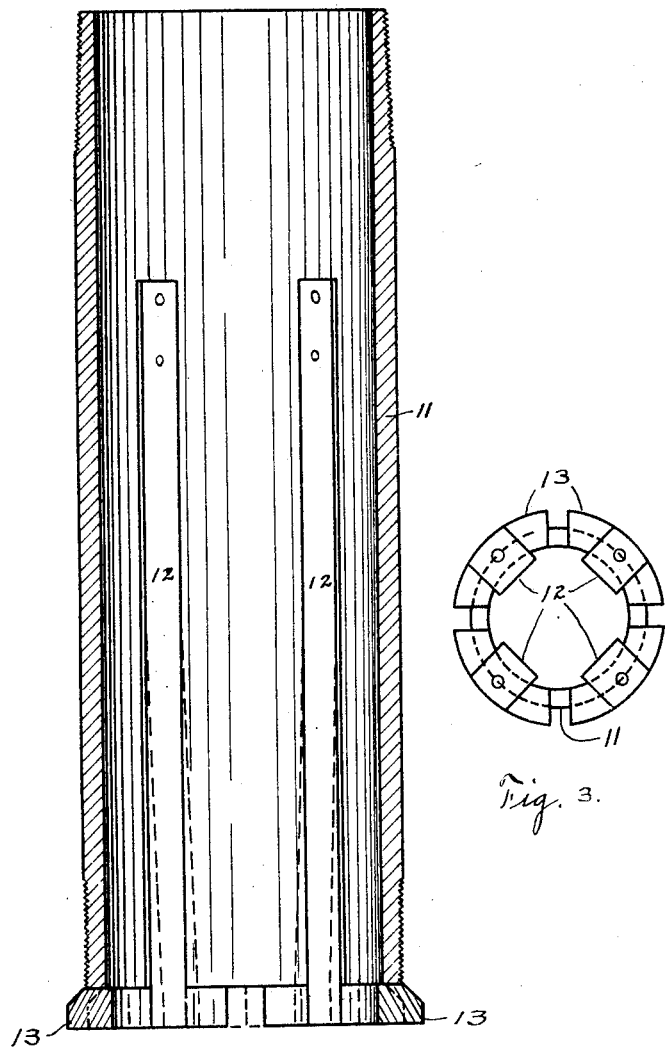

Patented Sept. 11, 1928.

1,683,640

UNITED STATES PATENT OFFICE.

EDMUND F. WEISE, OF HOUSTON, TEXAS, ASSIGNOR TO HOWARD F. SMITH, OF HARRIS COUNTY, TEXAS.

SEALING DEVICE.

Application filed August 12, 1919, Serial No. 316,943. Renewed September 7, 1923.

The invention relates to new and useful improvements in a sealing device, particularly adapted for use in oil wells, and designed for forming a seal or water tight joint between the screen which is set in the oil bearing strata and the casing which lines the bore.

One object of the invention is to provide a seal designed to be interposed between the upper end of the well screen and the lower end of the casing to form a fluid tight joint between them. The device, however, may be used whenever it is desired to form a fluid tight joint between pipes in a well bore.

With the above and other objects in view, the invention has particular relation to certain novel features of construction, operation and arrangement of parts, an example of which is given in this specification and illustrated in the accompanying drawings wherein:

The figure shows a vertical sectional view of the seal in position shown in its relation to the screen.

Referring now more particularly to the drawings, the numeral 1, refers to the casing which is usually set in a well bore. This casing ordinarily extends down approximately to the oil bearing strata, and the hole is then bored through said strata below the casing, and the screen 2, is set in the strata. The screen is usually considerably smaller in diameter than the casing, so as to permit the couplings, which connect the joints of pipe by means of which the screen is suspended, to readily pass down through the casing, and before the well is brought in, it is necessary to seal up the space within the casing surrounding the upper end of the screen so as to prevent the oil and gas from passing up on the outside of the screen into the casing. The numeral 3 designates a short pipe section which is connected to the upper end of the screen by means of the coupling 4, and surrounding this section, there is the upwardly flared ring 5, preferably formed of lead or other soft metal. This ring is fastened to the section 3 by means of annular ribs as 6, which are integral with the ring and which are seated in annular peripheral grooves carried by the section 3, and the lower end of the ring fits within the upper flared end of the coupling 4. Surrounding the upper end of the pipe section 3, there is a wedge like sleeve 7, which tapers downwardly and whose lower end fits within the upper end of the ring 5. When the well is completed, the screen is let down through the casing in the usual way and set in the oil bearing strata. This is done before the ring 5 is expanded. The wedge like sleeve 7 is then driven downwardly within the ring 5 causing said ring to expand against the casing on all sides, thus forming a tight joint and preventing the flow of fluid or gas up around the screen and into the casing above the screen. The upper end of the section 3 has a plurality of annular grooves, as 8, and there is a flat spring 9, fastened at its upper end to the sleeve 7, and whose lower end carries a dog 10, having a bevelled free end, said dog projecting through an aligned hole, in the sleeve and engaging in the corresponding groove 8. This arrangement provides for the securing of the sleeve 7 in position, and without some such arrangement, the strong gas pressure against the ring 5 from underneath, might force said sleeve 7 upwardly and permit the collapsing of the sealing ring and the escape of gas and fluid up around it.

What I claim is:

1. A sealing device including a tubular support, an annular abutment around the support whose upper end is outwardly flared, said support having an annular external groove above said abutment, an expansible sealing ring around said support whose lower end is tapered and fitted within the upper flared end of said abutment, an annular internal rib on said ring which fits into said groove, an annular wedge around the support adapted to wedge between the support and ring to expand the ring and whose lower end is inwardly tapered the upper end of said wedge extending above the support and being inwardly thickened.

2. A sealing device including a tubular support, an annular abutment around the support whose upper end is outwardly flared, said support having an annular external groove above said abutment, an expansible sealing ring around said support whose lower end is tapered and fitted within the upper flared end of said abutment, an annular internal rib on said ring which fits into said groove, an annular wedge around the support adapted to wedge between the support and ring to expand the ring and whose lower end is inwardly tapered, the upper end of the ring extending above the support and having an annular smooth upper end face.

3. A sealing device including a tubular support, an annular abutment around the support whose upper end is outwardly flared, said support having an annular external groove above said abutment, an expansible sealing ring around said support whose lower end is tapered and fitted within the upper flared end of said abutment, an annular internal rib on said ring which fits into said groove, an annular wedge fitted over and extending above the support adapted to wedge between the support and ring to expand the ring and whose lower end is inwardly tapered, the upper end of the ring being inwardly thickened to provide a wide annular upper end face, and means for interlocking the wedge with said support.

In testimony whereof he has signed his name to this specification.

EDMUND F. WEISE.